(No Model.)
H. JANSSEN.
FEED MECHANISM.
No. 478,511. Patented July 5, 1892.
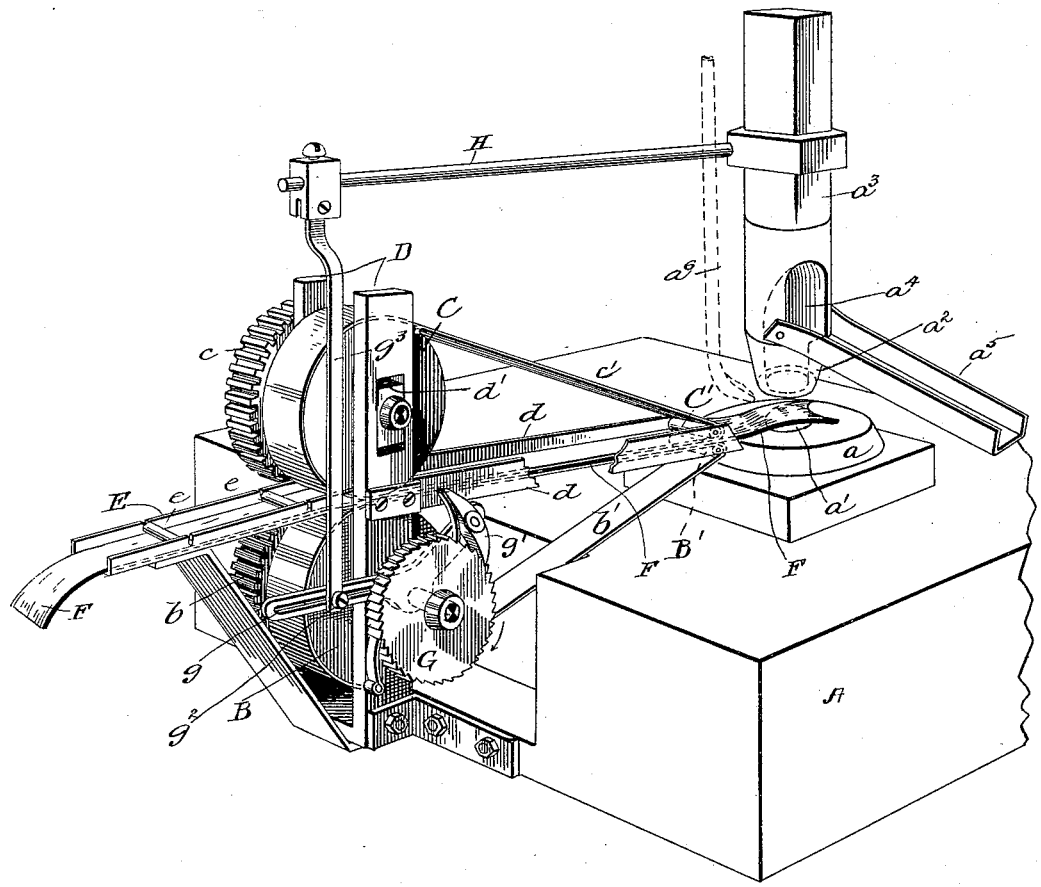
WITNESSES:
Frank S. Ober.
James F. Kavanagh.
INVENTOR
Henry Janssen,
BY
W. J. Johnston
ATTORNEY.

UNITED STATES PATENT OFFICE.

HENRY JANSSEN, OF BROOKLYN, ASSIGNOR TO SCHLOSS & SONS, OF NEW YORK, N. Y.

FEED MECHANISM.

SPECIFICATION forming part of Letters Patent No. 478,511, dated July 5, 1892.

Application filed October 9, 1891. Serial No. 408,277. (No model.)

*To all whom it may concern:*

Be it known that I, HENRY JANSSEN, a subject of the Emperor of Germany, residing in Brooklyn, county of Kings, and State of New York, have invented certain new and useful Improvements in Feed Mechanism, of which the following is a specification.

This invention relates to feeding mechanism for delivering material in the form of a strip to a cutting-die.

The object of the invention is to produce a machine which shall be entirely automatic in its operation and which will deliver the strip to the die in the best condition for cutting.

The invention consists of the construction and combination of parts, as hereinafter described and claimed.

The details of the invention will now be described with reference to the accompanying drawing, in which the figure is a perspective view of the feed mechanism and the die.

A is a base upon which is fixed an anvil $a$, having the lower half $a'$ of the die formed upon it. Arranged directly above this half of the die is an upper half $a^2$, mounted on the lower end of a vertically-reciprocating shaft $a^3$. The invention as at present used is attached to a die which cuts circular pieces from a strip of braid, which are used for covering buttons. The width of the braid is about equal to the disks which are cut from it. The disks as they are cut are forced upward through a chamber $a^4$ in the upper die and finally ejected therefrom through an opening in the side of the die and into a trough $a^5$, which conducts them into a receptacle properly located. This trough is rigidly connected with the upper die and moves up and down with it. The dotted lines $a^6$ indicate a pipe through which a blast of air is driven and directed across the face of the die to remove the waste cuttings and prevent clogging. This air-blast, together with the chambered upper die and trough $a^5$, performs the work of an operator who would have to remove the disks and the cuttings.

B and B' represent a pair of rolls, the former of which is several inches in diameter and the other as small as it is possible to make it and be operative. C and C' are another pair of rolls of exactly the same size, respectively. Rolls B and C are mounted in a frame D, they occupying the same vertical plane and having their shafts parallel to each other. They are geared together, so as to run at the same speed, by the two spur-gears $c\ b$. These rolls are mounted some distance from the dies, while the small rolls B' C' are placed as close to the dies as possible without interfering with the action of the latter. The small rolls are mounted in the outer ends of two extensions $d\ d$ from the main frame D. Over each pair of rolls B B' and C C' an endless belt $b'$ and $c'$, respectively, is carried. These belts while passing from the point of contact between the large rolls to the point of contact between the small rolls are face to face and in contact with each other. The extensions $d\ d$ of the frame act in a measure as guides, as they stand close to the edges of the belts. The roller C has its bearings in a slot $d'$ in the frame D, so that its weight may carry it down onto the roller B and exert a pressure upon the belts and anything else that may be between them.

E represents a trough or guide through which the strip of material F to be fed is conducted. Two lateral rollers $e\ e$ are mounted loosely in the sides of this trough to rest upon the strip and flatten it out.

Motion is imparted to the rollers and belts by means of the ratchet-wheel G, mounted on the shaft of the roller B. A lever $g$, pivoted intermediate of its extremities on the shaft, carries at one end a pawl $g'$, which engages with the teeth of the ratchet. The other end of the lever is slotted and connected by a set-screw $g^2$ with a vertical rod $g^3$. The latter is attached to the outer end of an arm H, rigidly connected with the shaft carrying the upper die. By adjusting the point of connection between the rod $g^3$ and lever $g$ along the slotted end of the latter the amount of feed can be regulated, according to the size of the die used. By these connections the movement of the die causes the rolls to rotate, as will be explained in the operation, which is as follows:

The strip of braid F is first directed between the rolls B and C by passing it under the rollers $e\ e$ in the guide E. The upper die is then set in motion. While traveling upward the pawl g' is forced into the teeth of the ratchet-wheel, causing it to turn in the direction of the arrow. The rolls are accordingly moved and the braid is gripped and carried with a step-by-step movement toward the die. While passing from the large rolls to the small ones the braid is held under gentle pressure and perfectly flat, so that when it leaves the small rolls it is in substantially the same condition it was in before it entered the feeding mechanism instead of being stretched out of shape and altered in size, as is the case when some kinds of feeding mechanism are used. The strip is pushed across the face of the lower die and held stationary while the upper die comes down and cuts it. A gentle pressure applied over a large surface of the braid will act in this instance to better advantage than a heavy pressure upon a comparatively small surface, and it is in this feature that one of the advantages of my invention lies. Another advantage is that by using the small rollers B' C', I can locate the point of delivery of the braid very near to the die, which enables me to feed very flexible and delicate material.

Having thus described my invention, I claim—

1. A feeding mechanism consisting of the combination of two sets of rolls and endless belts running around each set, the rolls in each set standing opposite each other in pairs and the belts running parallel and in contact with each other throughout the entire distance from one pair of rolls to the other, whereby a grip upon the article being fed is established and maintained throughout the distance between the pairs of rolls, and guides located each side of the portions of the belts that are in contact, substantially as described.

2. The combination, with a die, of a feeding mechanism consisting of the combination of two sets of rolls and endless belts running around each set, the rolls in each set standing opposite each other in pairs and the belts running parallel and in contact with each other throughout the entire distance from one pair of rolls to the other, whereby a grip upon the article being fed is established and maintained throughout the distance between the pairs of rolls, and guides located each side of the portions of the belts that are in contact, substantially as described.

3. The combination of the pair of large and small rolls B B', respectively, with the pair of large and small rolls C C', respectively, an endless belt carried by each pair, gearing connecting the rolls B and C, a ratchet-wheel connected with one of the large rolls, a pawl engaging the ratchet-wheel, a punch, and connections between the punch and the pawl, whereby motion of the punch causes the pawl to intermittently move the ratchet and belts, substantially as described.

4. The combination of the pair of large and small rolls B B', respectively, with the pair of large and small rolls C C', respectively, an endless belt carried by each pair, gearing connecting the rolls B and C, a ratchet-wheel connected with one of the large rolls, a slotted lever having a pawl engaging the ratchet-wheel, a movable punch, a rigid projection from the punch, and a rod or bar connected at one end to the said projection and having at its other end a screw adapted to enter the slot of the lever and secure it adjustably thereto, substantially as described.

In witness whereof I have hereunto signed my name in the presence of two subscribing witnesses.

HENRY JANSSEN.

Witnesses:
FRANK S. OBER,
WM. A. ROSENBAUM.